Sept. 18, 1962 D. C. BROWN 3,054,859

ARRANGEMENTS FOR PROVIDING TWO-WAY COMMUNICATION AT INTERMEDIATE POINTS ON A TELEPHONE CIRCUIT

Filed April 11, 1958

INVENTOR

DERRICK CHARLES BROWN

BY Irwin S. Thompson

ATTY.

United States Patent Office 3,054,859

Patented Sept. 18, 1962

3,054,859

ARRANGEMENTS FOR PROVIDING TWO-WAY COMMUNICATION AT INTERMEDIATE POINTS ON A TELEPHONE CIRCUIT

Derrick Charles Brown, Bexleyheath, England, assignor to Telephone Manufacturing Company Limited, London, England, a British company Filed Apr. 11, 1958, Ser. No. 727,860
5 Claims. (Cl. 179—15)

Figures 1, 2, 3:
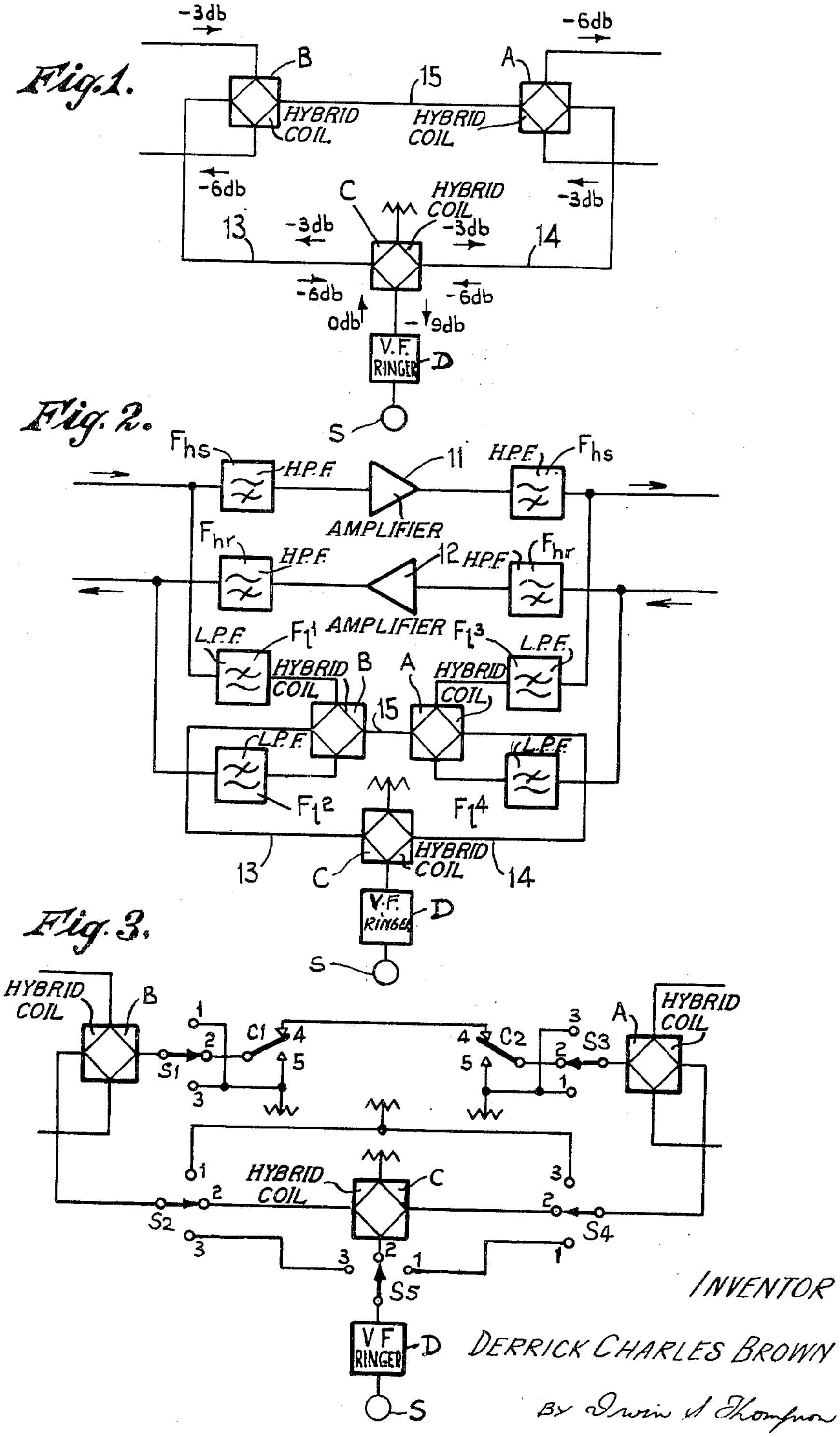

The present invention relates to telephone systems, and particularly to long distance circuits operated on a 4-wire basis. For such circuits facilities are often required for communication in both directions from an intermediate station. This requirement may arise, for example, at a repeater station in a multiplex carrier system or where two-way working is required between a "way" station and two other points, and in general the invention is concerned with means of communication in 4-wire circuits and, in particular between two points on a 4-wire circuit and a third intermediate point.

Consider for example a carrier telephone system having repeaters at suitable intervals in the transmission line and where it is required to have in, or connected to, each repeater station a local control or supervisory telephone. If it is attempted to provide a through circuit and, in addition, to have a party line for the supervisory circuit by bridging a local telephone circuit across the main path at a 2-wire switching point, some bridging loss is inevitable. Therefore, the local circuit has to be designed to keep this at a low value, e.g. 0.5 db, at all frequencies used on the main path. This necessarily means that the attenuation of the local to the main path, and vice versa, is high. Thus if normal test levels are to be maintained, two-way amplification must be provided in the local path as, as for example, by a 2-wire voice frequency repeater for each direction. Since the loss into the main circuit is high, these voice frequency repeaters would have to work at a high level, e.g. +20 db, and in addition to the additional repeaters themselves the requisite power supply units have to be provided.

The chief object of the invention is to provide improved means of communication between either of two points on a 4-wire circuit and an intermediate point without the need for additional amplifiers and power supplies and without introducing an unacceptable bridging loss.

According to the invention, in an arrangement for making a two-way speaking connection to a through 4-wire telephone channel, the channel is connected to two hybrid coils, the respective line sides of which are connected together while the balance sides extend respectively to a further hybrid coil to which the local telephone is connected.

At intermediate repeater stations on a carrier transmission system, it is a common practice to provide facilities for selective interconnection between the channels of incoming and outgoing circuits on a 2-wire basis. In view of the flexibility of connection thus introduced at these stations, they are commonly called "switching" stations. Such arrangements lend themselves readily to the practice of the invention since comparatively small additions and alterations are required.

The arrangement according to the invention is suitable for providing a local audio circuit at each repeater station of a carrier telephone system, in which case the local circuit is taken from the carrier line through low-pass filters for the "send" and "receive" lines at each side of the repeater, and each pair of these filters is connected to the "send" and "receive" sides respectively of a separate hybrid transformer, the local circuit being completed by connecting the "balance" sides of these two hybrids to the "send" and "receive" sides of a third hybrid.

Typical arrangements according to the invention will now be briefly described with reference to the accompanying diagrammatic drawings of which FIGURE 1 is a schematic diagram showing the general principle of the invention;

FIGURE 2 is a schematic diagram showing the application of the invention to the provision of a local supervisory circuit at a repeater; and FIGURE 3 shows the arrangement of FIGURE 1 modified for selective switching.

Referring first to FIGURE 1, A and B are two hybrid transformers at a 2-wire switching point on a 4-wire circuit. Transmission between A and B would normally be provided by means for a 2-wire connection between the hybrids such as is shown at 15, and the "balance" sides of these hybrids would be terminated by appropriate impedances. Normally, if a party line circuit were required, this would be bridged across the 2-wire connection 15 between the hybrids, resulting in the undesirable bridging loss above referred to. According to the invention, the impedances at the "balance" sides of the two hybrids are removed and connections 13 and 14 are made to the "send" and "receive" sides of a third hybrid C which is terminated in the usual manner and connected to the local telephone station S, a voice frequency ringer D or other signalling device being inserted if required. If the 2-wire connection 15 is retained between the hybrids A and B, through working is obtained in directions A to B and B to A is the main circuit. It will be seen that two-way communication is provided also between station S and each branch of the main circuit.

If through connection is not required in the main path, the 2-wire connection 15 between A and B is removed and these hybrids are instead each terminated by appropriate impedances at the side remote from hybrid C, in which case two-way communication is provided only between B and C or between A and C, but not between A and B. This might be the case for example in a "way" station working outwardly to two other points in which case the two remote stations would have contact with a common centre but not with each other.

A number of arrangements such as shown in FIGURE 1 connected in tandem would constitute a complete party line circuit. The levels shown in FIGURE 1 are those relating to the circuit when normal sending levels obtain in the local circuit. The circuit can be lined up to produce the required transmission equivalent for the system. Preferably different voice frequencies would be used for signalling the different local stations so as to give selective calling.

It will be understood that for convenience of description and for identifying the hybrid terminals, it has been stated that the "send" and "receive" sides of hybrid C are connected to the balance sides of hybrids A and B. It will be understood however that with the arrangement shown the line 13 can be either a "send" or "receive" path and the same applies to the line 14.

FIGURE 2 shows the application of the invention to the provision of an audio frequency supervisory circuit at a repeater station in a carrier system the line shown not including a 2-wire switching point but operating entirely on a 4-wire basis as regards the main circuit. Such local supervisory circuits are sometimes referred to as "engineering speaker" circuits.

The amplifiers 11 and 12 are connected in the main "send" and "receive" branches of the carriers system. An audio channel for the supervisory local circuit is filtered out and applied to the two hybrids A and B. This is done by the low-pass filters $F_1 1$ to $F_1 4$, whilst the carrier frequencies pass through the high-pass filters $F_hs$ in the "send" path and $F_hr$ in the "receive" path. A local circuit to station S is provided in a manner equivalent to that shown in FIGURE 1 by connecting the balance sides of hybrids A and B to the third hybrid C and by directly connecting the "line" sides of hybrids A and B by the 2-wire circuit 15.

In those situations in which it is not required to have a permanent through path between the hybrids A and B, such through path will need to be replaced by terminations and switching facilities may be provided either for terminating these hydrids or for establishing the through path as required. It will normally be desirable also to establish communication either between C and B or between C and A as desired. Switching facilities for this are shown diagrammatically in FIGURE 3. With the contacts C1 and C2 in position 4 and the switch arms S1–S5 in position 2, the arrangement is equivalent to that shown in FIGURE 1. If the contacts C1 and C2 are changed over to position 5, the hybrids A and B are terminated and the local station S is able to communicate with either of the distant stations but they cannot communicate with each other.

If the switch arms S1–S5 are moved to position 1, the line from the left is terminated and the line from the right is connected directly through to the local station S and the hybrid C is cut out entirely. Similarly if the switch arms are moved to position 3, the local station is connected to hybrid B and hybrid A is terminated. This facility is only possible when it is not necessary to maintain the through connection between the two distant stations.

It will be understood that the arrangement described provides party line working between a local station and two other points with the option of a through connection between these two other points, if required, without the insertion of amplifiers and power supplies. It will be understood that the arrangement is also applicable to phantom circuits. For example the hybrids A and B, instead of being connected by way of low-pass filters to the lines as in FIGURE 2, could be connected to the centre points of the appropriate windings of the transformers used in the phantom.

I claim:

1. In a telephone system employing a through 4-wire channel, means for making a two-way speaking connection from a local station to said 4-wire channel without appreciable bridging loss, comprising a first hybrid coil, connections from the send and receive sides respectively of said first hybrid coil to the ends of one set of send and receive conductors of said 4-wire channel, a second hybrid coil, connections from the send and receive sides respectively of said second hybrid coil to the ends of the other set of send and receive conductors of said 4-wire channel, connections joining the line sides of said first and second hybrid coils, a third hybrid coil, connections from the balance sides of said first and second hybrid coils respectively to the send and receive sides of said third hybrid coil, a telephone at said local station connected to the line side of said third hybrid coil and a termination connected to the balance side of said third hybrid coil.

2. In a telephone system as claimed in claim 1, arrangements for signalling said local station in response to signalling currents of voice frequency transmitted thereto.

3. In a telephone system employing a through 4-wire channel, means for making a two-way speaking connection from a local station to said 4-wire channel without appreciable bridging loss, comprising a first hybrid coil, connections from the send and receive sides respectively of said first hybrid coil to the ends of one set of send and receive conductors of said 4-wire channel, a second hybrid coil, connections from the send and receive sides respectively of said second hybrid coil to the ends of the other set of send and receive conductors of said 4-wire channel, connections joining the line sides of said first and second hybrid coils, a third hybrid coil, connections from the balance sides of said first and second hybrid coils respectively to the send and receive sides of said third hybrid coil, a telephone at said local station connected to the line side of said third hybrid coil, a first termination connected to the balance side of said third hybrid coil, a second termination, a third termination, and switching means for opening the connections joining the line sides of said first and second hybrid coils and connecting said line sides respectively to said second and third terminations when said local station telephone is being used.

4. In a telephone system employing a through 4-wire channel, means for making a two-way speaking connection from a local station to said 4-wire channel without appreciable bridging loss, comprising a first hybrid coil, connections from the send and receive sides respectively of said first hybrid coil to the ends of one set of send and receive conductors of said 4-wire channel, a second hybrid coil, connections from the send and receive sides respectively of said second hybrid coil to the ends of the other set of send and receive conductors of said 4-wire channel, connections joining the line sides of said first and second hybrid coils, a third hybrid coil, connections from the balance sides of said first and second hybrid coils respectively to the send and receive sides of said third hybrid coil, a telephone at said local station connected to the line side of said third hybrid coil, a first termination connected to the balance side of said third hybrid coil, a second termination, a third termination, a fourth termination, and switching means for opening the connections joining the line sides of said first and second hybrid coils and connecting said line sides respectively to said second and third terminations and also for selectively connecting said local station telephone to the balance side of either one of said first and second hybrid coils and said fourth termination to the balance side of the other one of said first and second hybrid coils.

5. In a multi-channel carrier current signalling system employing a 4-wire circuit, means for making a two-way speaking connection from a local station to said 4-wire circuit without appreciable bridging loss, comprising a pair of amplifiers connected respectively in the circuits in the two directions of transmission, high pass filters of the same cut-off frequency preceding and following both said amplifiers, low pass filters of substantially the same cut-off frequency as said high pass filters connected in parallel therewith so as to isolate a frequency band representing one speech channel, a first hybrid coil, connections from said low pass filters on one side of said amplifiers to the send and receive sides respectively of said first hybrid coil, a second hybrid coil, connections from said low pass filters on the other side of said amplifiers to the send and receive sides respectively of said second hybrid coil, connections joining the line sides of said first and second hybrid coils, a third hybrid coil, connections from the balance sides of said first and second hybrid coils respectively to the send and receive sides of said third hybrid coil, a telephone at said local station connected to to the line side of said third hybrid coil and a termination connected to the balance side of said third hybrid coil.

References Cited in the file of this patent

UNITED STATES PATENTS

| | | |
|---|---|---|
| 1,406,678 | Mortimer | Feb. 14, 1922 |
| 1,697,933 | Shackleton | Jan. 8, 1929 |
| 2,106,337 | Black | Jan. 25, 1938 |
| 2,485,748 | Kucera | Oct. 25, 1949 |
| 2,523,914 | Molnar | Sept. 26, 1950 |
| 2,564,048 | Bartelink | Aug. 14, 1951 |
| 2,812,388 | Thomas | Nov. 5, 1957 |